Sept. 7, 1926.

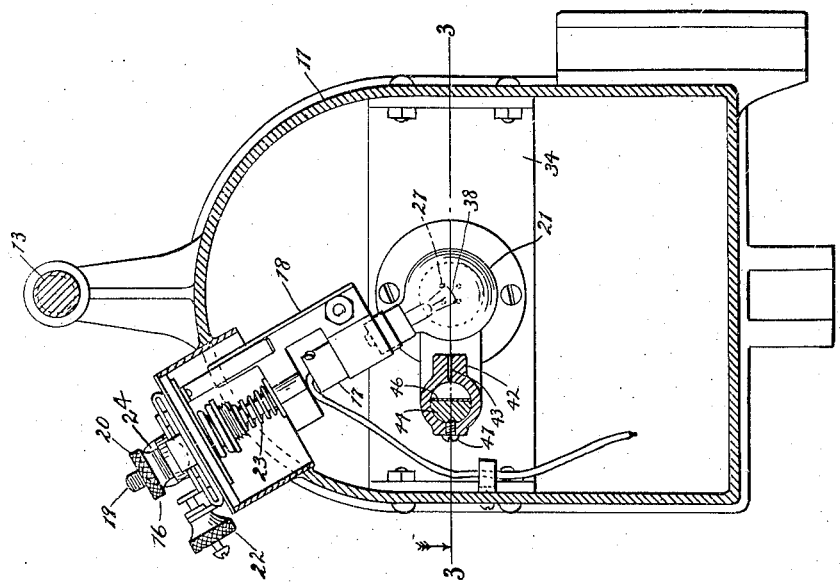
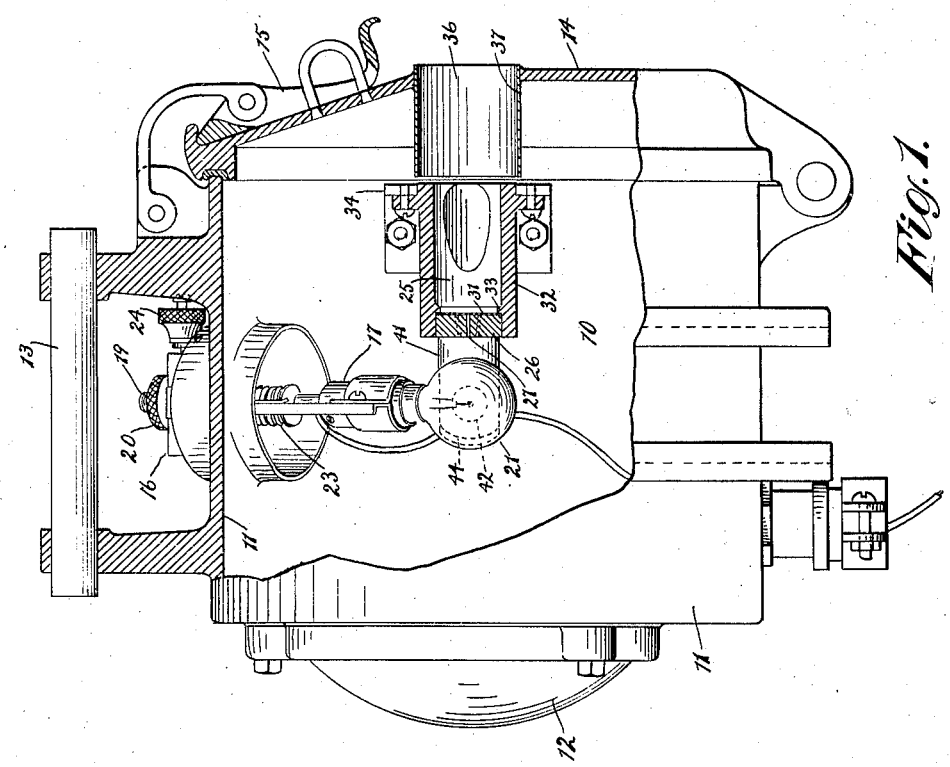

W. S. HAMM

FOCUSING DEVICE

Filed March 8, 1924   3 Sheets-Sheet 2

1,598,817

Inventor:
William S. Hamm
By Gillson, Mann & Cox
Attys.

Sept. 7, 1926.

W. S. HAMM 1,598,817

FOCUSING DEVICE

Filed March 8, 1924  3 Sheets-Sheet 3

Inventor:
William S. Hamm
By Gillson, Mann & Cox
Att'ys

Patented Sept. 7, 1926.

1,598,817

UNITED STATES PATENT OFFICE.

WILLIAM S. HAMM, OF HUBBARD WOODS, ILLINOIS, ASSIGNOR TO THE ADAMS & WESTLAKE COMPANY, A CORPORATION OF ILLINOIS.

FOCUSING DEVICE.

Application filed March 8, 1924. Serial No. 697,921.

This invention relates to illumination, and more particularly to devices for semaphore or signal lights and the like.

One of the objects of the invention is the provision of new and improved means for determining when a source of light is at a predetermined point without subjecting the eyes of the observer to the direct rays of light.

Another object of the invention is the provision of a new and improved device for determining the focal position of a source of light in a signal lamp by which the observations may be made from a single point and, if desired, without the necessity of opening the casing of the lamp or disturbing any portion thereof.

A further object of the invention is the provision of means whereby the focal position of a source of light may be determined by observing the contour or intensity of illuminated portions of an indicating member.

A still further object of the invention is the provision of a device for determining the focal position of a source of light, that is simple in construction, cheap to manufacture, easily assembled, efficient in operation, and that is not likely to become broken or get out of order.

Other further objects and advantages of the invention will appear from the following description taken in connection with the accompanying drawings, in which—

Fig. 1 is a side elevation of a semaphore or signal light, showing my invention in position therein, with parts in section and parts broken away;

Fig. 2 is a section on line 2—2 of Fig. 3;

Figure 3:
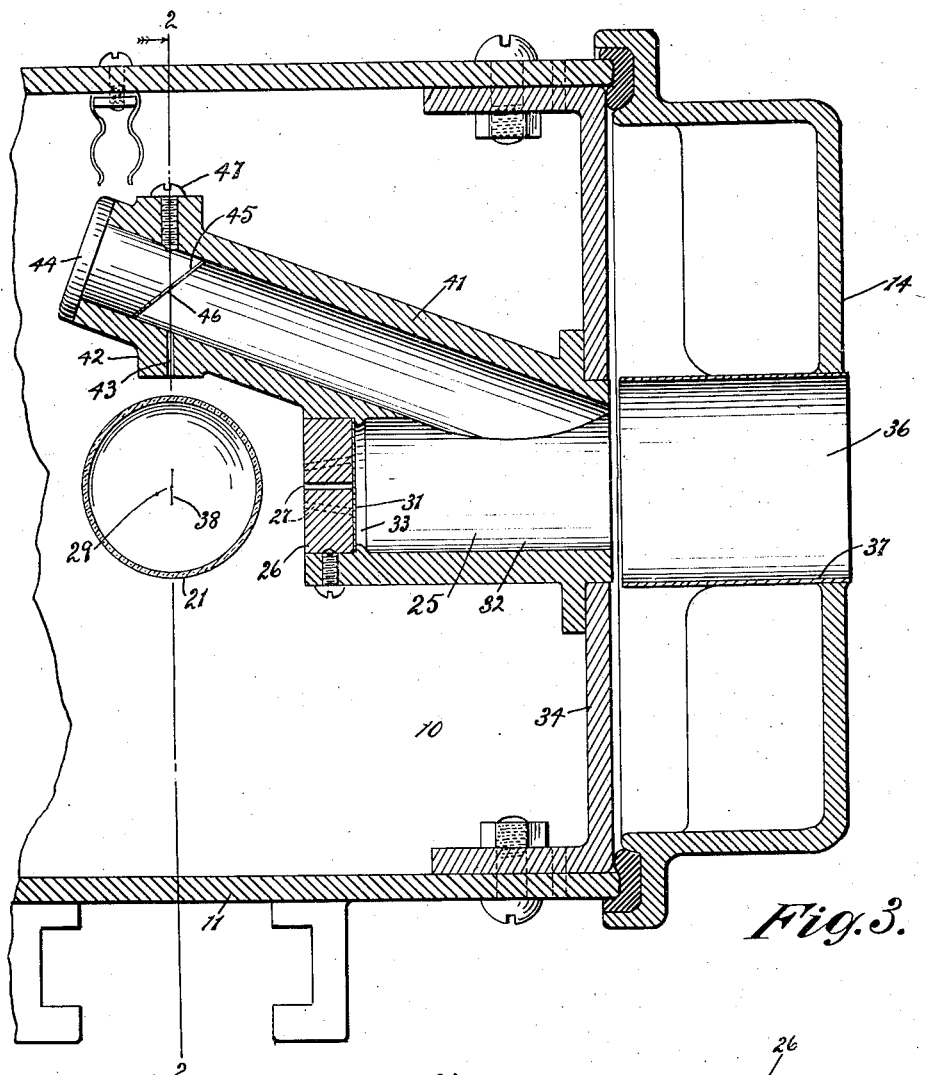
Fig. 3 is a horizontal section on line 3—3 of Fig. 2.
Figure 4:
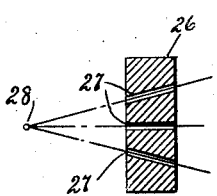
Fig. 4 is a sectional view of the block showing the converging bores therethrough.

The advent of electric signal lights with extremely small filaments necessitates the use of devices for positioning and for more accurately determining when the filament is in focus. The present invention in its broader aspect comprises means for ascertaining when a source of light or illuminated object is located at a predetermined point. It is especially adapted for determining when any source of light, however small, is properly in the focus of a lens or reflector. For simplicity of illustration and convenience in description, the device is disclosed in connection with a semaphore or signal light, the predetermined point being the focus of the lens. It is understood however that the use of the device is not limited to this particular type of structure and that the disclosure herein is by way of example only, although the device shown is operative and thoroughly practical.

On the drawings, the reference character 10 designates a signal lamp which is provided with a casing 11, lens 12 at the front thereof, a handle 13, a lid 14 for closing the rear end of the casing, and an eccentric latch 15 for clamping and holding the lid in closed position, all of which may be of the usual or any well known construction.

It is necessary in signal lamps that the source of light be in focus and since electric light bulbs and the filaments therein are not uniform in their construction, suitable means are usually provided for adjusting the bulb relative to the focal point. Any suitable means may be employed for this purpose. One form of bulb supporting and universal adjusting device is shown at 16 on the drawings, and comprises a socket 17 carried by a support 18 swiveled to the lower end of the adjusting post 19 which permits the bulb 21 secured in the socket 17 in the usual manner to be adjusted axially of the post 19. The post is moved outwardly by the thumb nut 20 against the tension of the spring 23. The post 19 is moved laterally by rotating the thumb nut 22 and transversely at right angles thereto by rotating the thumb nut 24. Since the details of the construction of the bulb adjusting device form no part of the present invention the same will not be further described.

In practice, the bulb adjusting and supporting device is so mounted that only a slight adjustment will be necessary to focus the light when the bulb is inserted.

Suitable means are provided for determining when the light is properly focused. Often the lamps are in positions difficult of access, and since the bulbs must be renewed, and new ones focused in all kinds of weather, it is desirable that this means be so constructed that the observations and adjustments may be made without necessitating a change of position on the part of the observer.

In the form of the device illustrated in Figs. 1 to 5 inclusive, an observation device 25 is mounted in any suitable manner on the lamp. This device comprises a screen 31 and means for permitting portions only of said screen to be illuminated when the source of light is at the predetermined point, the predetermined point in this construction being the focus of the lens. Any suitable means for permitting the passage of diverging rays of light to illuminate portions only of the screen may be employed. This means is provided with light passages and in the device shown it is in the form of a block 26 having a plurality of converging openings or bores 27 of small caliber extending longitudinally therethrough. Each opening should be so constructed that the rays of light passing through it will be substantially parallel. In the present construction this is accomplished by employing a block of such dimensions that the bores therethrough will have material length. The block is so mounted that the converging point 28 of the bores is at the focus 29 of the lens 12, whereby when the source of light is at the focus of the lens rays therefrom will pass through all of said bores, and will form illuminated spots on said screen 31.

The screen 31 is preferably translucent, whereby the spots may be seen thereon from the opposite side without subjecting the eyes of the observer to the direct rays from the source of light. Each bore, having a material diameter, although small, will necessarily permit some rays to pass therethrough when the source is adjacent to but not actually on its axial line. The spot formed by these rays will be of different contour and also of different intensity from that formed when the source of light is on the axial line, thus enabling the observer to determine the correct position of the bulb by the contour or intensity, or both, of the spots. These are important features of the invention, since they not only protect the eyes of the observer but enable him to make more reliable observations in order to more accurately focus the source of light.

While only two bores 27 are absolutely necessary, a larger number enables the observer to more easily focus the light as they increase the field of observation on both the near and far sides of the focus. As shown, five bores are employed. They are arranged in the form of a square with a central bore on the axis of the lens 12.

It is desirable that the screen 31 be shaded so that the spots will appear sharp and distinct on said screen during the daytime as well as at night. Any suitable means may be employed for this purpose. Preferably the block 26 is inserted in one end of an observation tube 32, against an internal shoulder 33. The screen 31 is adapted to be inserted and held between said block and shoulder. The opposite end of said tube is rigidly secured to a support 34 mounted on the casing 11, preferably on the inside of said casing. The support 34 is provided with an opening in alinement with said tube.

The observation device may be located in any suitable position adjacent to the focus of the light. Where a lens is employed the device may be arranged so that the observations may be taken from the rear although it is understood that the arrangement may be otherwise.

In order to prevent the entrance of rain, snow and the like into the casing 11 during the focusing operation, means may be provided for conducting the observations without opening the casing 11 or disturbing any portion thereof. An observation opening is made in the wall of the lamp that is adjacent to the end of the tube 32. As shown, the lid 14 is provided with an opening 36 in alinement with the tube 32 and a tube 37 is mounted therein. The tube extends inwardly sufficiently far to be adjacent to the support 34 when the lid is closed. By this arrangement the interior of the lamp is protected. The tube 37 is, of course, not necessary where the observation tube 32 is attached directly to one wall of the casing. Moreover, the opening in the door 14 may be dispensed with and the observations made by first opening the door.

Since the source of light is not a point, being in the present instance an electric light filament 38, an additional light transmitting passage arranged at a considerable angle from the ones just described may be employed as a means of checking up on the observations. As shown, the observation tube 32 is provided with a branch tube 41 having a boss 42 on the side adjacent the source of light and provided with a bore 43 preferably arranged at right angles to the axis of the lens 12, the axis of the bore passing through the focal point of said lens. A plug 44 has its beveled face 45 provided with suitable means as a coat of paint 46 for forming a screen on which the rays of light passing through the bore 43 may be projected to form a spot observable from the rear of the tube 32. This plug is secured in the end of the tube 41 by any suitable means, as the screw 47.

The parts are so arranged that rays from a source of light when in the focus of the lens 12 will form a spot of light on the screen 46 and may be observed through the tube 37.

Since the plane of the filament is usually arranged at right angles to the axis of the lens in order to spread the light laterally, the single bore 43 having its axis passing through the focus at right angles to the axis of the lens will be sufficient to determine when the filament is at the focal distance from the lens.

Figure 5:
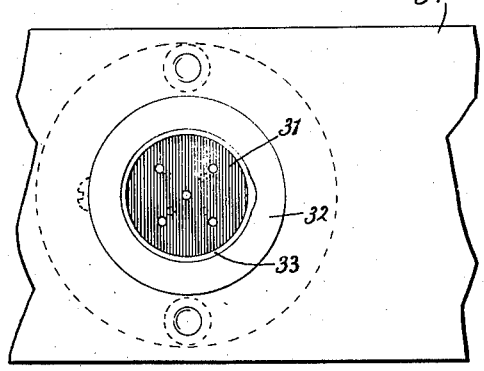
Fig. 5 is an end view of the observation tube and its support, showing the light spots on the indicator member.

In the operation of the device, the observations are all made through the tube 37 by observing the spots on the screen, that is, by observing the spots on the screen 31 alone or by observing the spots on both screens 31 and 46. In the construction shown the bores or passages being the same in cross section, the bulb is adjusted until the light spots on the screen 31 are all of the same contour, being circular if circular bores are employed, as indicated in Fig. 5. This will indicate that the source of light is at the focal point of the lens. The spots will now all be of the same intensity, that is, they will all be illuminated uniformly and with no dark or shaded portions. If a spot of light be now present on the screen 46, the filament has been arranged symmetrical with respect to the focus of the lens with the plane of the filament passing through said focus. The observations may also be made by using both screens by noting the spot on the screen 46 and any one of the spots, as for instance the central one, on the screen 31. If the lamp be provided with an observation opening 36, as shown in Fig. 3, the observations may be made without opening the casing 11 or disturbing any portion of the lamp.

Figure 6:
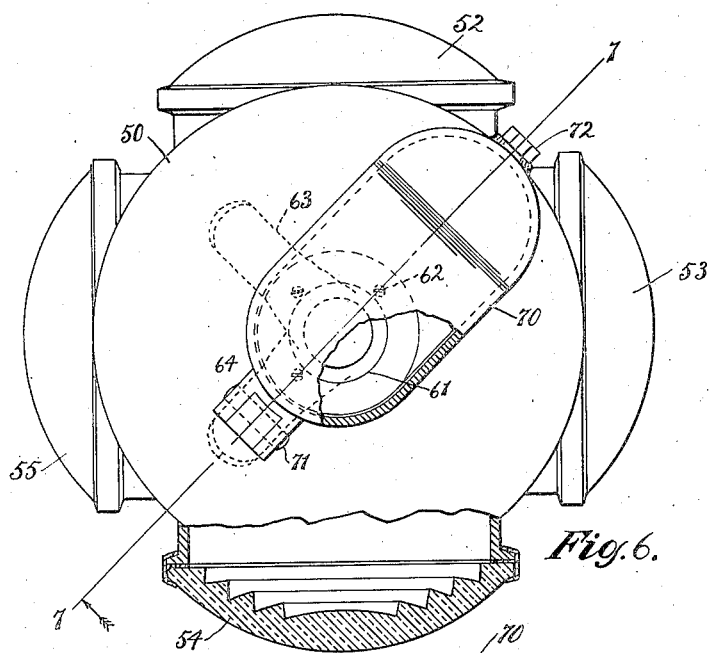
Fig. 6 is a plan view of a lamp showing a modified form of the device in position therein, with parts in section and parts broken away.
Figure 8:
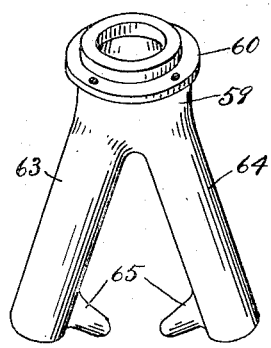
Fig. 8 is a perspective view of the attachment.
Figure 7:
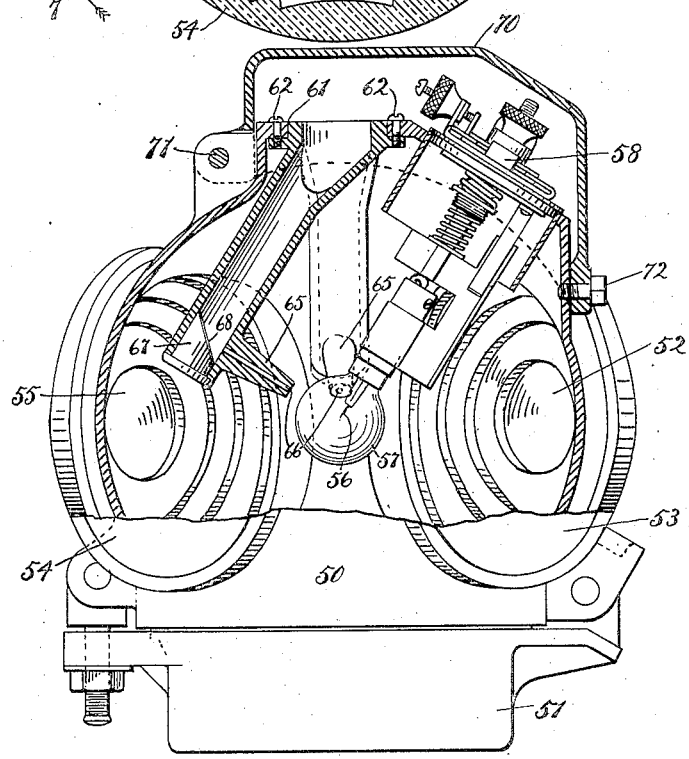
Fig. 7 is a section on line 7—7 of Fig. 6, with parts broken away.

In Figs. 6, 7 and 8 is shown a modified form of the device which is also in the form of an attachment that is adapted to be employed in connection with a signal lamp provided with a plurality of lenses.

The casing 50 of the lamp may be pivoted to the base 51, and is provided with the lenses 52, 53, 54 and 55 arranged at an angle of 90° apart, as is usual in such constructions. The lenses are so arranged that they have a common focal point 56. The source of light for the lantern such as an electric light bulb 57 is so mounted that it may be positioned at said focal point in any suitable manner as by means of the universal adjusting device 58.

It is desirable that the means for determining when the source of light is at the focal point of the lamp be so arranged that the same may be left on the lamp during the use of the latter without interfering with its operation.

The observation device comprises a main or observation tube 59 which may be provided with a flange 60 for engaging about an opening 61 provided in the top of the lamp. Suitable fastening means as the screws 62 secure the tube in proper position in the lamp casing. The tube 59 is provided at its lower end with a plurality of branch tubes 63 and 64, preferably two in number. The axes of these branch tubes pass through the main tube 59 and are so arranged that they intersect at a convenient position whereby observations through the branch tubes may be taken simultaneously.

The branch tubes 63 and 64 are arranged at an angle to each other and in a plane at an angle to the axis of the tube 59, whereby when the device is assembled in the lamp each branch tube will extend downwardly and outwardly between two adjacent lenses, as indicated by dotted lines in Fig. 6. By this arrangement the branch tubes 63 and 64 do not intercept the rays of light passing through the lenses.

The lower ends of the branch tubes are provided with members having light passages therethrough. As shown, the tubes are provided with the lugs or projections 65 having the small bores 66 extending axially therethrough. The axes of the bores are convergent and the device is so mounted that the convergent point coincides with the focal point of the lenses.

Suitable screen members 67 are mounted in the end of each tube, each of these members may be in the form of a plug having an oblique face 68 for receiving rays of light through the passage or bore 66 from the focal point of the lenses.

Observations are made through the tube 59 and when the source of light has been properly adjusted, spots or images will appear on the screens 68 in the same manner as on the screen 46 in the device shown in Figs. 1 to 3. If the cross-section of the light passages 66 be the same, the spots on the screens 68 will be of the same intensity and contour when the source of light is in proper focus.

The observation mechanism and adjusting device may be and preferably are protected from the elements by a suitable cover 70 which is shown as being pivoted as at 71 to the casing 50. A suitable fastening means, as the screw or bolt 72 holds the cover in closed position.

It is thought from the foregoing taken in connection with the accompanying drawings that the construction and operation of my device will be apparent to those skilled in the art, and that various changes in size, shape, proportion and details of construction may be made without departing from the spirit and scope of the appended claims.

I claim as my invention:

1. Means for ascertaining when a source of light is at a predetermined position, comprising means provided with converging light passages of extended length and small caliber, and screen means across the divergent ends of said passages whereby spots of uniform contour and intensity will be projected thereon when said source of light is in said position.

2. In a device for determining the focal position of the lens, means having light passages therethrough, devices for supporting said means whereby the axes of said passages will pass through the focal point of said lens, and translucent means extending across the divergent ends of said passages.

3. In a lamp, a light concentrating means having a focal point, a source of light, screen means and means to cause spots of light to appear on said screen means when said source of light is at the focal point of said light concentrating means, and means including a tubular member for shading said screen means whereby the spots of light will be readily discernible at all times.

4. In combination, a lamp provided with a light concentrating means having a focal point, a closure for said casing, an observation tube rigidly mounted on said casing, a block in the inner end of said tube provided with converging light passages, the converging point being coincident with the said focal point, and a screen of translucent material across the outer end of said block, said closure being provided with an opening in alinement with said tube.

5. An observation attachment for lamps comprising an observation tube, a branch tube extending at an angle therefrom, said tubes being provided with light passages the axes of which pass through a common point and screen means for receiving spots of light from each tube when the source thereof is at said common point.

6. In a lamp provided with a casing, means carried by said casing and having light passages, the axes of said passages being substantially at right angles to each other and intersecting at a predetermined point, and means provided with intersecting passages and including a reflector in one of said passages, for conducting rays of light passing through said first-named passages to a common point outside of said casing.

7. In a lamp provided with a casing, a lens associated with said casing, a source of light, and means for determining when said source of light is in the focus of said lens, said means comprising a block member provided with a plurality of extended converging passages arranged adjacent to said source of light, and a translucent screen engaging said member at the divergent ends of said passages.

WILLIAM S. HAMM.